US008619156B2

(12) United States Patent
Wajs

(10) Patent No.: US 8,619,156 B2
(45) Date of Patent: Dec. 31, 2013

(54) IMAGE CAPTURING SYSTEM AND METHOD OF CONTROLLING THE SAME UTILIZING EXPOSURE CONTROL THAT CAPTURES MULTIPLE IMAGES OF DIFFERENT SPATIAL RESOLUTIONS

(75) Inventor: Andrew Augustine Wajs, Haarlem (NL)

(73) Assignee: Silvercrest Investment Holdings Limited, Tortola (VG)

( * ) Notice: Subject to any disclaimer, the term of this patent is extended or adjusted under 35 U.S.C. 154(b) by 0 days.

(21) Appl. No.: 13/052,333

(22) Filed: Mar. 21, 2011

(65) Prior Publication Data

US 2011/0228139 A1   Sep. 22, 2011

Related U.S. Application Data

(62) Division of application No. 11/913,819, filed as application No. PCT/EP2005/052121 on May 10, 2005, now abandoned.

(51) Int. Cl.
*H04N 5/262* (2006.01)
*G03B 7/093* (2006.01)

(52) U.S. Cl.
USPC ..................................... 348/229.1; 348/230.1

(58) Field of Classification Search
USPC .................................................. 396/213–262
See application file for complete search history.

(56) References Cited

U.S. PATENT DOCUMENTS

| | | |
|---|---|---|
| 4,647,975 A | 3/1987 | Alston |
| 5,025,394 A | 6/1991 | Parke |

(Continued)

FOREIGN PATENT DOCUMENTS

| | | |
|---|---|---|
| EP | 0358498 | 3/1990 |
| EP | 0940978 | 9/1999 |

(Continued)

OTHER PUBLICATIONS

Written opinion of the European Patent Office in counterpart foreign application No. PCT/EP2005/052121 filed May 10, 2005.

(Continued)

*Primary Examiner* — James Hannett
*Assistant Examiner* — Dwight C Tejano
(74) *Attorney, Agent, or Firm* — Steven M. Koehler; Westman, Champlin & Koehler, P.A.

(57) ABSTRACT

A method of controlling an image capturing system comprising an interface for receiving an external trigger to capture an image, and an image capturing device provided with a photosensitive area and an array of pixel cells, each pixel cell including a device for generating a signal indicative of the intensity of light falling on an associated part of the photosensitive area, which image capturing device is further provided with readout circuitry for generating an array of pixel values to capture an image frame at a set spatial resolution, such that each pixel value represents an integral of the signal or signals generated in at least one of the pixel cells in an associated one of a number of areas over an exposure time interval, the number of areas being determined by the set spatial resolution, the areas together covering a region of the photosensitive area corresponding to a region in the image, comprises receiving an external trigger to capture an image, and, in response to the external trigger, directing the image capturing device to capture at least two image frames by generating respective arrays of pixel values representing integrals over respective consecutive exposure time intervals. The spatial resolutions of at least two of the captured image frames are set to different values.

7 Claims, 3 Drawing Sheets

(56) References Cited

U.S. PATENT DOCUMENTS

| | | | |
|---|---|---|---|
| 5,657,402 | A | 8/1997 | Bender et al. |
| 5,694,167 | A | 12/1997 | Hashimoto |
| 5,929,908 | A * | 7/1999 | Takahashi et al. ............ 348/364 |
| 6,084,229 | A | 7/2000 | Pace |
| 6,429,895 | B1 | 8/2002 | Onuki |
| 6,590,198 | B1 | 7/2003 | Zarnowski |
| 6,639,626 | B1 * | 10/2003 | Kubo et al. ................ 348/218.1 |
| 6,750,903 | B1 | 6/2004 | Miyatake |
| 6,960,420 | B2 | 11/2005 | Komatso |
| 7,502,053 | B2 | 3/2009 | Kagawa et al. |
| 2001/0009437 | A1 * | 7/2001 | Klein et al. .................. 348/207 |
| 2002/0012065 | A1 | 1/2002 | Watanabe |
| 2002/0060744 | A1 * | 5/2002 | Fukushima .................. 348/364 |
| 2002/0134911 | A1 | 9/2002 | Zarnowski |
| 2003/0108252 | A1 * | 6/2003 | Carrig ........................... 382/299 |
| 2004/0142275 | A1 | 7/2004 | Komatso |
| 2004/0160525 | A1 * | 8/2004 | Kingetsu et al. ............. 348/364 |
| 2005/0013509 | A1 | 1/2005 | Samadani |

FOREIGN PATENT DOCUMENTS

| | | |
|---|---|---|
| EP | 1202563 | 5/2002 |
| JP | S62-108678 | 5/1987 |
| JP | H04-207581 | 7/1992 |
| JP | 2002223387 | 8/2002 |
| JP | 2004357335 | 12/2004 |
| WO | WO03/047234 | 6/2003 |
| WO | WO03/084207 | 10/2003 |
| WO | WO2005/122084 | 12/2005 |

OTHER PUBLICATIONS

Official Search Report of the European Patent Office in counterpart foreign application No. PCT/EP2005/052121 filed May 10, 2005.

Japan Non-Final Office Action mailed Jun. 15, 2010.

* cited by examiner

IMAGE CAPTURING SYSTEM AND METHOD OF CONTROLLING THE SAME UTILIZING EXPOSURE CONTROL THAT CAPTURES MULTIPLE IMAGES OF DIFFERENT SPATIAL RESOLUTIONS

CROSS-REFERENCE TO RELATED APPLICATION

The present application is a divisional application and claims priority of U.S. patent application Ser. No. 11/913,819, filed Nov. 7, 2007, which is a Section 371 National Stage Application of and claims priority of International patent application Serial No. PCT/EP2005/052121, filed May 10, 2005, and published as WO 2006/119802 in English, the contents of both of which are hereby incorporated by reference in their entirety.

BACKGROUND OF THE INVENTION

The invention relates to a method of controlling an image capturing system comprising an interface for receiving an external trigger to capture an image, and an image capturing device provided with a photosensitive area and an array of pixel cells, each pixel cell including a device for generating a signal indicative of the intensity of light falling on an associated part of the photosensitive area, which image capturing device is further provided with readout circuitry for generating an array of pixel values to capture an image frame at a set spatial resolution, such that each pixel value represents an integral of the signal or signals generated in at least one of the pixel cells in an associated one of a number of areas over an exposure time interval, the number of areas being determined by the set spatial resolution, the areas together covering a region of the photosensitive area corresponding to a region in the image.

The invention also relates to an image capturing system.

The invention also relates to a method of forming a combined final image from a plurality of image frames, including the steps of: obtaining a first and at least one further array of intensity values, each array of intensity values encoding light intensity levels at each of a respective number of pixel positions in the respective image frame, the number determining the spatial resolution of the image frame concerned, generating a set of derived arrays of intensity values, each derived array being based on a respective one of the obtained arrays of intensity levels and encoding light intensity levels at each of a common number of pixel positions in at least a region of overlap of the respective image frames, generating an array of combined intensity values, each element in the array based on a sum of intensity values represented by the corresponding element in each of the respective derived arrays of intensity values, and providing an array of intensity values encoding the combined final image, the array being based on the array of combined intensity values.

The invention also relates to an image processing system.

The invention also relates to a digital camera.

The invention also relates to a computer program.

The aforementioned application describes a digital camera. The camera can be used in a substantially stationary position to capture a sequence of images and to derive a sequence of corresponding frames of pixel values representing the images. Each image is underexposed on purpose. The images are adjusted prior to forming them into a combined final image. The combined final image is formed by summing the values of corresponding pixels in the adjusted images. The combined final image may therefore be formed from underexposed images, but is itself sufficiently bright, as well as having good spatial resolution. The adjustment is used to prevent the combined final image from being blurred.

A problem associated with capturing a series of underexposed image frames for later combination is due to the types of image capturing devices available for use. Generally, these either have pixel cells comprising Charge Coupled Devices (CCDs) or are made with Complementary Metal Oxide Semiconductor (CMOS) sensors, in both cases with associated read-out circuitry. In particular when CCD arrays are used, the readout time, i.e. the time needed by the read-out circuitry to generate the array of pixel values encoding a frame, is very long. The time needed to capture a series of consecutive image frames for subsequent formation of a combined image, is thus even longer. Setting the image spatial resolution to a lower value results in a lower spatial resolution combined image if interpolation techniques are used to increase the spatial resolution of the captured image frames. Reducing the number of captured image frames on which to base the combined final image would achieve a lower total image capture time, but at the expense of a decreased signal-to-noise ratio (SNR) of the combined final image.

SUMMARY OF THE INVENTION

This Summary and Abstract are provided to introduce some concepts in a simplified form that are further described below in the Detailed Description. This Summary and Abstract are not intended to identify key features or essential features of the claimed subject matter, nor are they intended to be used as an aid in determining the scope of the claimed subject matter. In addition, the description herein provided and the claimed subject matter should not be interpreted as being directed to addressing any of the short-comings discussed in the Background.

Aspects of the invention include methods and systems of the type defined above, that results in image frames for formation into a combined final image with a relatively low noise level whilst requiring a relatively short overall image capture time.

In one embodiment of capturing an image, a method includes receiving an external trigger to capture the image, and, in response to the external trigger, directing the image capturing device to capture at least two image frames by generating respective arrays of pixel values representing integrals over respective consecutive exposure time intervals, wherein the spatial resolutions of at least two of the captured image frames are set to different values.

Because at least two of the captured image frames have different spatial resolutions, there is always at least one image frame with a higher and at least one with a lower resolution. Capturing an image frame with a higher resolution ensures that information with a high spatial frequency is present in the combined final image. Because not all image frames have the same, higher, resolution, the total time needed to capture and read out all the image data is relatively low, however. Because the external trigger, e.g. a user command, results directly in the capture of at least two image frames, the image frames in the series follow each other as closely as possible, saving additional time. The change in settings to set a different resolution is also accomplished automatically in response to the external trigger. Because the image frames are captured separately in such a manner that they may be combined into a combined final image by summation, the combined final image may be composed of image frames with relatively short exposure times, leading to a combined final image with little blur.

In a further embodiment, at least the lower of the spatial resolution values is set by directing the image capturing device to generate an array of pixel values in such a manner that each pixel value is representative of the integral of the sum of the signals generated by at least two devices in pixel cells.

Such a technique is commonly referred to as 'binning', and has the effect of increasing sensitivity, because the two or more devices in pixel cells effectively occupy a larger part of the photosensitive area. Furthermore, the captured image frame has a lower noise level.

In yet a further embodiment, the method includes retrieving a desired exposure time for a combined final image, determining the number of image frames to be captured, and for each image frame, calculating settings determining an exposure level applicable to the image frame, the settings including the length of the exposure time interval, wherein the settings are calculated so that the sum of the lengths of the exposure time intervals over the number of image frames is equal to or less than the desired exposure time.

Each of the captured images is underexposed when viewed alone. The combined final image is not, however, because it is based on the combined total of image frames. This embodiment has the advantage that it enables addition of intensity levels representative of pixel values in the various image frames to generate one combined final image with a correct exposure.

An embodiment includes the step of generating a set of arrays of pixel values, each based on one of the captured image frames, in such a manner that each encodes at least a region of an adjusted frame at the same spatial resolution.

This embodiment increases the suitability of the captured image frames for generating a combined final image by summing corresponding pixel values in at least the regions of the adjusted frames.

According to another aspect of the invention, there is provided an image capturing system comprising an interface for receiving an external trigger to capture an image, an image capturing device provided with a photosensitive area and an array of pixel cells, each pixel cell including a device for generating a signal indicative of the intensity of light falling on an associated part of the photosensitive area, which image capturing device is further provided with readout circuitry for generating an array of pixel values to capture an image frame at a set spatial resolution, such that each pixel value represents an integral of the signal or signals generated in at least one of the pixel cells in an associated one of a number of areas over an exposure time interval, the number of areas being determined by the set spatial resolution, the areas together covering a region of the photosensitive area corresponding to a region in the image, which image capturing system comprises a control system for controlling the operation of the image capturing device and for processing commands received through the interface, wherein the control system is configured to, in response to the external trigger, direct the image capturing device to capture at least two image frames by generating respective arrays of pixel values representing integrals over respective consecutive exposure time intervals, wherein the control system is further configured to set the spatial resolutions of at least two of the captured image frames to different values.

In an embodiment, the image capturing system according to an aspect of the invention is configured to execute a method of capturing an image according to an aspect of the invention.

According to another aspect of the invention, the method of forming a combined final image from a plurality of image frames includes the steps of: obtaining a first and at least one further array of intensity values, each array of intensity values encoding light intensity levels at each of a respective number of pixel positions in the respective image frame, the number determining the spatial resolution of the image frame concerned, generating a set of derived arrays of intensity values, each derived array being based on a respective one of the obtained arrays of intensity levels and encoding light intensity levels at each of a common number of pixel positions in at least a region of overlap of the respective image frames, generating an array of combined intensity values, each element in the array based on a sum of intensity values represented by the corresponding element in each of the respective derived arrays of intensity values, and providing an array of intensity values encoding the combined final image, the array being based on the array of combined intensity values, wherein a first array of intensity values encoding at least the region of overlap at a higher resolution than the further arrays of intensity values is obtained, an array of intensity values encoding at least the region of overlap in the combined final image at a higher spatial resolution than the further arrays of intensity values is provided, and the array of intensity values encoding the combined final image is based on a sufficient number of intensity values in the first array of intensity values to encode the region of overlap at a higher resolution than the further arrays of intensity values.

The method has the advantage of resulting in a combined final image with a relatively high resolution without requiring a large number of image frames of the same resolution. Because each element in the array of combined intensity values is based on a sum of intensity values represented by the corresponding element in each of the respective derived arrays of intensity values, the step of generating this array of combined intensity values removes noise. Because the array of intensity values is based on the array of combined intensity values, at least partially, the beneficial effect extends to the combined final image. Therefore, the combined final image has at once a relatively high spatial resolution and low noise level.

A first embodiment of the method includes obtaining first and further arrays of intensity values in which each intensity value represents a light level in an area surrounding a pixel position, wherein at least one derived array of intensity values is obtained by adjusting the number of intensity values in an array by a multiplication factor, such that each derived array encodes at least the region of overlap at the same spatial resolution.

This embodiment has the effect of enabling the step of generating an array of combined intensity values to be performed by straightforward summation in the space-domain.

In a variant of this embodiment, the number of intensity values in at least one array based on an obtained further array of intensity values is adjusted by a multiplication factor larger than one.

Thus, at least one low-resolution image frame is converted to a higher resolution. This is an effective way of ensuring that the array of intensity values encoding the combined final image is based on a sufficient number of intensity values in the first array of intensity values, since a sub-set, or in one embodiment all, of the intensity values in the first obtained array can simply be added to their counterparts in the arrays obtained by adjustment to obtain a weighted average. The array of combined intensity values also encodes the final image.

In a second embodiment, each derived array of intensity values is generated by transforming an image frame encoded by an array of intensity values based on one of the obtained arrays of intensity values and in which each intensity value represents a light level in an area surrounding a pixel position in an image frame, into the spatial frequency domain, such that each intensity value in a derived array of intensity values represents an intensity of a spatial frequency component of the image frame.

This embodiment has the advantage that it is not necessary to expand image frames with a low spatial resolution in order to be able to carry out the step of generating an array of combined intensity values. In particular, interpolation is avoided. Instead, each derived array of intensity values includes low-frequency components of the image frames that are derivable from each of the obtained image frames. Relatively few additions are thus required to generate the array of intensity values encoding at least the region of overlap in the combined final image.

In a variant, the step of providing the array of intensity values encoding the combined final image includes replacing at least one intensity value representing a low spatial frequency component in the derived array of intensity values based on the first obtained array of intensity values by an intensity value based at least partly on the intensity value representing the corresponding spatial frequency component in the array of combined intensity values.

Each replacement value may be based on the value it replaces, in order to prevent the occurrence of a ringing effect. Irrespective of this, this variant is a particularly efficient way to arrive at a combined final image based on a sufficient number of intensity values in the first array of intensity values to encode the region of overlap at a higher resolution than the further arrays of intensity values. It suffices to transform the derived array based on the first array back to the space-domain subsequent to replacing the intensity values representing low spatial frequency components. In the thus obtained combined final image, the high-frequency information is derived from the first array, whereas the low-frequency information is a combination of the low-frequency information in the first and further arrays.

In a variant, the transformation is carried out by a co-processor comprising at least a partial implementation in hardware of an image compression algorithm or by a digital signal processor programmed to implement an image compression algorithm.

This variant is particularly suited to implementation in a digital camera or other type of image processing equipment, which commonly comprise such a co-processor. Since many compression algorithms involve the use of a form of entropy coding for which transformation into the spatial frequency domain is required, this variant is very efficient.

In an embodiment, the step of generating an array of combined intensity values is preceded by a step of aligning the image frames, such that each derived array encodes light intensity levels at each of substantially corresponding pixel position in at least the region of overlap.

This ensures that the combined final image is relatively sharp, since 'fuzziness' due to misalignment of the image frames encoded by the obtained arrays of intensity values is avoided. Such misalignment is apt to occur where the arrays of intensity values are obtained by means of a digital camera taking pictures of a scene in succession. Of course, 'fuzziness' due to trembling of objects or persons in the scene is also removed.

In an embodiment, at least one array of intensity values, based on an obtained array of intensity values encoding at least the region of overlap in the respective image frame at a higher spatial resolution than at least one further array of intensity values, is subjected to a digital filter operation having a characteristic of passing high spatial frequency components of the image encoded by the array.

Because the higher resolution image also has a higher noise level, but is only really needed to provide image information with a high spatial frequency, the noise level of the combined final image at lower frequencies is thus reduced. This is advantageous because the human eye is most sensitive at relatively low spatial frequencies.

According to another aspect, an aspect of the invention provides an image processing system for forming a combined final image from a plurality of image frames, which image processing system includes an arrangement for loading a first and at least one further array of intensity values, each array of intensity values encoding light intensity levels at each of a respective number of pixel positions in the respective image frame, the number determining the spatial resolution of the image frame concerned, and a data processing arrangement for processing the intensity values, wherein the system is configured to direct the data processing arrangement to perform the steps of generating a set of derived arrays of intensity values, each derived array being based on a respective one of the obtained arrays of intensity levels and encoding light intensity levels at each of a common number of pixel positions in at least a region of overlap of the respective image frames, generating an array of combined intensity values, each element in the array based on a sum of intensity values represented by the corresponding element in each of the respective derived arrays of intensity values, and providing an array of intensity values encoding the combined final image, the array being based on the array of combined intensity values, wherein the system is configured to load a first array of intensity values encoding at least the region of overlap at a higher resolution than the further arrays of intensity values, to provide an array of intensity values encoding at least the region of overlap in the combined final image at a higher spatial resolution than the further arrays of intensity values, and to base the array of intensity values encoding the combined final image on a sufficient number of intensity values in the first array of intensity values to encode the region of overlap at a higher resolution than the further arrays of intensity values.

In one embodiment, the image processing system is configured to direct the processor to execute a method according of forming a combined final image according to an aspect of the invention.

According to another aspect, the invention provides a computer program configured, when loaded into a programmable processing device to enable the programmable processing device to carry out a method according to an aspect of the invention.

According to another aspect, the invention provides a digital camera comprising an image capturing system and/or an image processing system according to an aspect of the invention.

BRIEF DESCRIPTION OF THE DRAWINGS

The invention will now be explained in further detail with reference to the accompanying drawings, in which.

DETAILED DESCRIPTION OF THE ILLUSTRATIVE EMBODIMENTS

Figure 1:
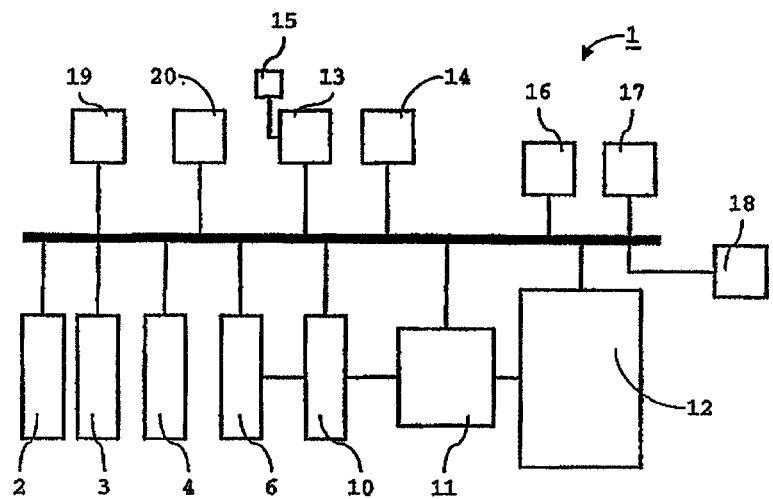
FIG. 1 shows schematically the layout of an exemplary digital camera.

One example of an image processing system usable in the context of the methods outlined herein is a digital camera 1. Other examples include a photocopier or scanning device.

The digital camera 1 comprises a lens system 2 for focusing on one or more objects in a scene. When a shutter 3 is opened, the scene is projected through an aperture 4 onto a photosensitive area 5 (FIG. 2) of an image-capturing device 6. The shutter time is controllable, as is the diameter of the aperture. As an alternative, or addition, to the shutter 3, the image capturing device could be electronically controlled to provide the same effect (electronic shutter). The image-capturing device 6 can be device implemented in Complementary Metal-Oxide Semiconductor (CMOS) technology, or a Charge-Coupled Device (CCD) sensor. The method outlined herein are ideally suited to CCD sensors, which have the advantage of being cheap to manufacture, but have inherently long read-out times.

Figure 2:
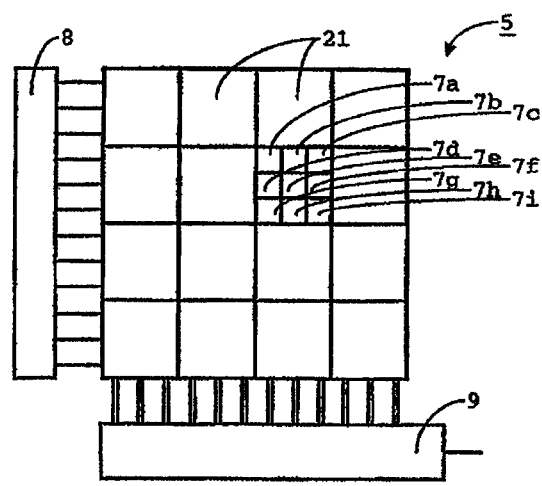
FIG. 2 shows in very schematic fashion some components of an image capturing device in the camera.
Figure 3:
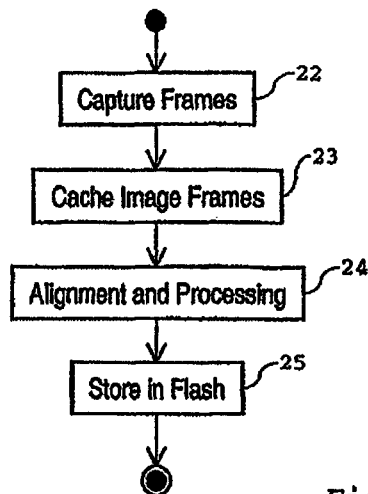
FIG. 3 is a flow diagram illustrating a method of capturing image frames and forming a combined final image.

Referring to FIG. 2, the photosensitive area 5 is divided into areas occupied by pixel cells 7a-i, of which only nine are shown for clarity. Each pixel cell 7 includes a device for generating a signal indicative of the intensity of light to which the area that it occupies within the photosensitive area 5, is exposed. The device is, as stated, in one embodiment, a CCD sensor. It is noted that the devices occupying the pixel cells 7a-i are generally provided as components of one integrated circuit. An integral of the signal generated by a device is formed during exposure, for example by accumulation of photocurrent in a capacitor. Subsequent to exposure of the photosensitive area 5 for the duration of an exposure time interval, the values of the integrals of the generated signals are read out by means of row selection circuit 8 and column selection and readout circuit 9.

It is noted that, for simplicity, this description will not focus on the way in which colour images are captured. It is merely observed that any known type of technology can be used, such as colour filters, a colour-sensitive variant of the image capturing device 6, etc. In this respect, it is also observed that the photosensitive area 5 need not be the surface area of an integrated circuit comprised in an image-capturing device, or at least not for all colour components. Furthermore, although in the present application, image frames will be said to be captured consecutively, this does not preclude embodiments, wherein image frames of different colour components are captured in order, so that 'consecutively' captured image frames detailing one colour component are alternated by those detailing other colour components.

The output of the column select and read-out circuit 9 is provided in the form of one or more analog signals to an Analog-to-Digital converter (A/D-converter) 10. The A/D-converter 10 samples and quantises the signals received from the image capturing device 6, i.e. records it on a scale with discrete levels, the number of which is determined by the number of bits of resolution of the digital words provided as output by the A/D converter 10. The A/D converter 10 provides as output an array of pixel values encoding a captured image frame.

A Digital Signal Processor (DSP) 11 performs such features as interpolation between pixels and optionally compression of the image. Each exposure of the image-capturing device during an exposure time interval results in at least one frame.

The digital camera 1 comprises a storage device 12 for storing the image data encoding the captured images or image frames. The storage device can be any usual type of storage device, e.g. built-in flash memory, inserted flash memory modules, a disk drive with a floppy disk, a PCMCIA-format hard disk, or an optical disk drive.

A microprocessor 13 controls the operation of the digital camera 1, by executing instructions stored in non-volatile memory, in this example a Read-Only Memory (ROM) 14. The instructions in ROM 14, in some embodiments in combination with routines programmed for execution by DSP 11, enable the digital camera 1 to execute the image processing and capturing methods outlined in the present application.

Advantageously, the microprocessor 13 communicates with a co-processor 15 in which at least part of an image compression algorithm is implemented in hardware. Algorithms to compress images in accordance with the JPEG-standard are usable, for example. As part of the compression algorithm, the image data is transformed into the spatial frequency domain. The co-processor 15 executes at least this transformation, using a Discrete Cosine Transform (DCT) in most cases.

Indications of the operating conditions and settings of the digital camera 1 are provided on an output device 16, for example a Liquid Crystal Display, possibly in combination with a sound-producing device (not illustrated separately).

An input device 17 is shown schematically as being representative of the controls by means of which the user of the digital camera provides commands. In addition, the digital camera 1 illustrated in FIG. 1 comprises a flash driver circuit 18 for providing appropriate driving signals to one or more sources of flash lighting. The illustrated digital camera 1 also comprises a motion sensor 19, for providing a signal representative of the movement of the digital camera 1, and thus of the image-capturing device 6. Furthermore, the digital camera 1 comprises an exposure metering device 20. The purpose of the exposure metering device 20 is to measure the strength of the ambient light, so that the microprocessor 13 can determine the intensity of light to be emitted by any connected flash, in combination with the correct values for the settings determining the exposure, which include the exposure time interval for each captured image frame, as will be elaborated on below.

It will be noted that the density of the areas occupied by the pixel cells 7a-i determines the maximum attainable spatial resolution of a captured image frame. The readout time depends on the number of pixel cells. It can be relatively long in embodiments such as the one illustrated in FIG. 2, because each row is selected in turn using row selection circuit 8, whereupon the column selection and readout circuit 9 senses the values of the accumulated photocharge stored in the photodevices in the pixel cells in that row. To reduce the total time involved in repeatedly exposing the photosensitive area and capturing an image frame, the spatial resolution is set to a different value between exposures.

The microprocessor 13 defines a number of cluster areas 21, which together cover a region corresponding to a region of interest in the combined final image. The number is smaller than the number of pixel cells 7a-i that together cover the region. Thus, a cluster of pixel cells occupies each defined cluster area 21, as is schematically illustrated in FIG. 2. For the sake of clarity, not all pixel cells 7 are shown. To capture an image frame at a lower spatial resolution, one pixel value per cluster area 21 is read out. To capture an image frame at the highest possible spatial resolution, one pixel value per pixel cell 7 is read out. Incidentally, although the cluster areas 21 as illustrated have been defined such as to partition the photosensitive area 5, the microprocessor 13 may alternatively or additionally define a number of overlapping areas which together cover a region of the photosensitive area 5 corresponding to the region of interest. Alternatively, areas may be defined with a slight spacing between them. To avoid having to carry out compensatory processing, the defined areas each can surround regularly distributed pixel positions.

In one embodiment, the microprocessor 13 controls the image-capturing device 6 in such a manner that the one pixel value read out per cluster area 21 represents an integral of the signal generated in one of the pixel cells 7 that lie within the cluster area 21. This embodiment has the virtue that it can be used with any type of image-capturing device 6.

In one embodiment, the image-capturing device 6 has the capability to "bin" the outputs of multiple pixel cells. In this embodiment, the microprocessor 13 directs the image-capturing device 6 to generate an array of pixel values (each value being associated with one of the defined cluster areas 21) in such a manner that each pixel value is representative of the integral of the sum of the signals generated by at least two device in pixel cells that occupy the same defined cluster area 21. In this shown embodiment, this could mean that the pixel value for one cluster area 21 is the sum, or alternatively the average, of the integrals of the signal generated by all nine of the shown pixel cells 7a-7i. This embodiment is advantageous, because it increases the sensitivity. Effectively, each pixel value represents the amount of light that fell on the whole of a defined cluster area 21, instead of just on the area occupied by one pixel cell 7. Thus, smaller light fluxes are detectable. Furthermore, binning decreases the amount of noise, i.e. leads to a low resolution image with a higher Signal-to-Noise-Ratio (SNR). As the binning capability is a function of the image-capturing device that is implemented in hardware, it does not add appreciably to the read out time. In one embodiment, the number of image frames that are captured at the highest resolution is equal to, but in some cases lower than, the number of image frames captured at lower spatial resolutions. A combined final image formed on the basis of such a series of image frames will have a good SNR.

In yet a further embodiment, upon receiving a command from a user to capture an image, the microprocessor 13 controls the digital camera 1 to carry out a series of steps 22-25. In one example, the command is alternatively received from a device (not shown) connected to the digital camera 1 through a suitable interface. This device issues an external trigger to start the execution of the illustrated steps. A user of the digital camera 1 may input a desired exposure time for a combined final image, together with settings determining the amount of flash light, the diameter of aperture 4 and the sensitivity of the photodevices in the pixel cells 7. In alternative embodiments, the microprocessor determines one or more of these values automatically, using a signal output by the exposure metering device 20, and possibly one or more pre-defined combinations of values. Subsequently, the microprocessor 13, upon receiving a command actually to capture the combined final image, executes a first step 22 of capturing a number of image frames. This step 22 comprises retrieving the desired exposure time for the combined final image, determining the number of image frames to be captured and, for each image frame, calculating exposure settings determining an exposure level applicable to the image frame. The settings include the exposure time interval for the frame. In some cases, the other settings are determined such as to result in exposure time intervals for the image frames that, together, are shorter than the desired exposure time for the combined final image. It is noted that the embodiment in which "binning" is carried out allows a reduction in the exposure time interval applicable to the image frames, because binning increases the sensitivity. Effectively, 'binning' results in the introduction of an extra amplification of the photo-electric signal. The microprocessor 13 advantageously takes account of this. It calculates the length of the exposure time interval applicable to the image frame at a lower spatial resolution value in dependence on the spatial resolution value, i.e. the amount of 'binning'.

When calculating the settings determining the exposure levels applicable to the image frames, the microprocessor 13 preferably implements one or more of the methods outlined in international patent application PCT/EP04/051080. That is, they are calculated such that the total exposure level that is determined as desirable for the combined final image is unevenly distributed over the image frames. The passages in that application relating to the stepping of exposure levels are hereby incorporated by reference, and recapitulated briefly.

As mentioned above, the exposure level is determined by the exposure time, aperture, (flash) lighting intensity, and the amplifier gain in a pixel cell. It is further determined by the A/D conversion threshold of the A/D converter 10. Stepping the amplification used to amplify an output of the photodevice in each pixel cell 7 has the advantage of easy implementation. In alternative embodiments, the exposure time for image frames of the same resolution is varied. In other embodiments, the maximum intensity of light admitted onto the photosensitive area is varied per image frame, for example by adjusting the size of the aperture 4, or the intensity of the flash controlled through the flash driver circuit 18.

In a first embodiment, the size of the aperture 4, as well as the lighting conditions, are kept constant between exposures. The desired exposure time for the combined final image is unevenly distributed over the image frames. In one embodiment, the number of image frames is selected to keep the exposure time interval for each image frame below a certain threshold level. For instance, this threshold level is pre-determined at 1/60 second, as this is considered the lowest shutter speed to capture a steady image for the average photographer.

In one variant, the exposure time is varied randomly between frames. In another embodiment, settings of the image capturing system, in this case the exposure time, are adjusted before several further captures of a frame in such a manner that at least a maximum of the scale on which intensity values for each pixel are recorded changes substantially uniformly in value with each adjustment. This has the advantage of resulting in a more accurate capture of the colour and tonal depth in the combined final image. In each case, where binning is used to adjust the spatial resolution between captured frames as well, the impact on the exposure level is taken into account.

In an alternative embodiment, the size of the aperture 4 is adjusted between two successive captures of an image frame in such a manner that at least a maximum of the scale on which intensity values for each pixel are recorded changes substantially uniformly in value with each adjustment. The exposure level is stepped down in equal increments by adjusting the aperture area. If no binning is applied, then the aperture area is stepped down in equal increments. Otherwise it is scaled with the multiplication factor resulting from basing each pixel value on the signals from multiple pixel cells.

In yet another embodiment, the intensity of artificial light used to illuminate a scene to which the image-capturing device 6 is exposed is decreased in steps. Where the resolution decreases simultaneously, the intensity of artificial light is decreased by increasing amounts.

Embodiments combining one or more of the techniques described in the preceding paragraphs are also conceivable.

Following the first step 22 in which the image frames are captured, the arrays of pixel values encoding the image frames are cached in a second step 23. Following the second step 23, they are aligned and processed in a third step 24. The combined final image resulting from the third step is stored in storage device 12 in a final step 25. Although the present description will now continue on the assumption that the digital camera 1 carries out all of the steps 22-25, the third and fourth steps 24,25 could be carried out in a separate image processing system, for example a personal computer or workstation. In that case, the second step would involve committing the generated arrays of pixel values to storage in the storage device 12 or transferring them to the computer via a data link (not shown).

Two embodiments of a method of forming a combined final image as performed in the course of executing steps 23 and 24 are described below by way of example. They have in common that arrays of intensity values are obtained as input. The arrays of intensity values encode light intensity values at each of a respective number of pixel positions in the respective image frame, the number determining the spatial resolution of the image frame concerned. A set of derived arrays of intensity values is generated, each derived array being based on a respective one of the obtained arrays of intensity levels and encoding light intensity levels at each of a common number of pixel positions in at least a region of overlap of the respective image frames. In a first embodiment, the derived arrays encode the image frame in the space domain; in the second embodiment, the derived arrays encode the image frame in the spatial frequency domain. It is observed that the term 'derived array' is not intended to signify that an array of values is stored as a data construct in memory. It is sufficient that corresponding elements of a notional array are available for summation at a certain point in time. Thus, each $i^{th}$ element of each derived array should be available concurrently. This allows for the generation of an array of combined intensity values, in which each $i^{th}$ element is based on a sum—which may be a weighted sum—of the $i^{th}$ elements of the derived arrays. The values of the latter represent intensity values in the space or spatial frequency domain, as the case may be. It is further observed that the derived arrays may correspond fully to the obtained arrays. This would be the case if the obtained arrays are already in the right domain for summation, and encode respective image frames that are already aligned, for instance. Both embodiments further have in common that an array of intensity values encoding the combined final image is provided as output, this array being based on the array of combined intensity values obtained by summation. In some embodiments, it is actually identical to the array of combined intensity values.

In a first embodiment, as part of either the second step 23 or the third step 24, the set of captured image frames is converted in a set of adjusted image frames encoded by a corresponding set of arrays of pixel values. In this first embodiment, each pixel value in an array of intensity values encoding a captured image frame represents a light level in an area 21 surrounding one of a number of pixel positions. The number of pixel positions is proportional to the spatial resolution of the image frame, because the sizes of the respective image frames are the same. Each array of intensity values derived subsequently encodes an adjusted image frame based on one of the captured image frames. Each is generated in such a manner that each encodes at least a region of an adjusted frame at a desired resolution that is the same for each of the derived arrays. The region may correspond to the entire image frame, incidentally. Each array encoding an adjusted image frame is generated in such a manner that corresponding pixel values encoding the region in the arrays represent respective light level in an area surrounding substantially the same pixel position. That is to say, the $i^{th}$ pixel value of the pixel values of each array that encode the same region of interest corresponds to the same pixel position in each array for all values of i corresponding to a pixel position in the region of interest.

Because the spatial resolution differs between captured image frames, the spatial resolution of at least one of them must be adjusted by a multiplication factor, at least in the region of interest. Otherwise, it would not be possible to achieve the characteristic that each array of pixel values encoding an adjusted frame encodes at least the region of interest at the same spatial resolution. Preferably, the resolution of the lower-resolution frames is increased. This results in a combined final image with the highest possible perceived spatial resolution when the pixel values encoding the region are summed to form the combined final image. Any known technique to increase the spatial resolution may be applied, for instance interpolation.

Then, the derived arrays of pixel values, encoding the image frames adjusted in resolution are used to generate an array of combined pixel values. Each element in this array is the sum of the corresponding elements of the derived arrays. In one example, the sum is a weighted sum. For example, the weights may be inversely related to the exposure times of the image frames. In another example, each combined pixel value is an average of the corresponding pixel values. The thus formed array is provided as output.

Figure 4A:
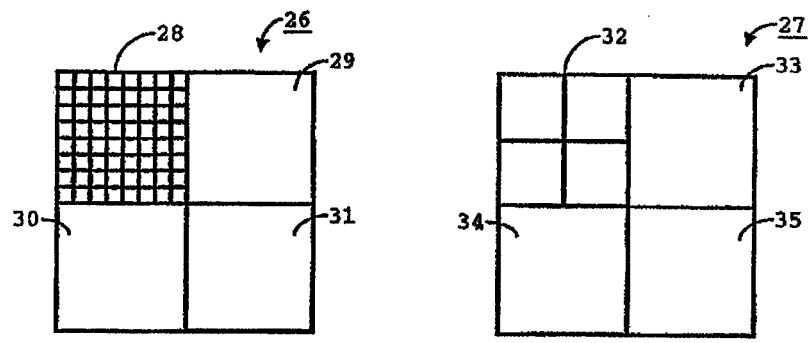
FIGS. 4A-4C show in very schematic fashion arrays of intensity values illustrating how the combined final image is formed in one embodiment.
Figure 4B:
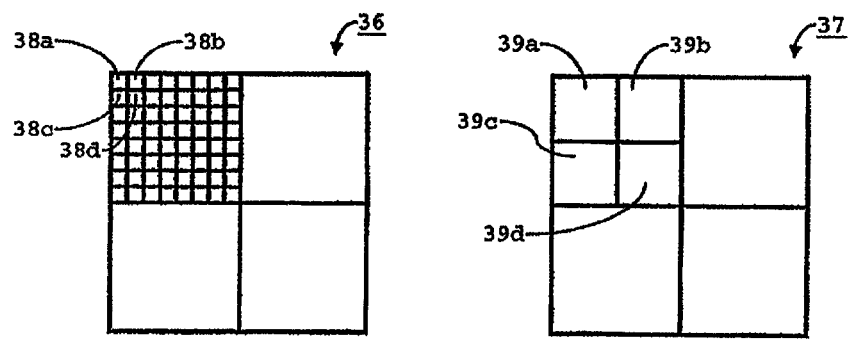
Figure 4C:
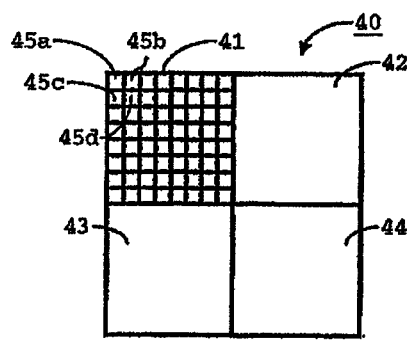

A second embodiment of the method of forming a combined final image is illustrated in FIGS. 4A-4C. A first array 26 of pixel values encodes light intensity levels at each of a respective number of pixel positions in a first image frame. Each intensity value represents a light level in an area surrounding a pixel position. The same is true for a second array 27 of pixel values, encoding a second image frame. The first and second image frames represent the same captured scene. It will be assumed herein that the image frames encoded by the first and second arrays 26,27 have previously been aligned. There are known methods for aligning images to sub-pixel resolution, for example using sample points.

The first array 26 of pixel values is divided into four blocks 28-31. The second array 27 of pixel values is divided into the same number of blocks 32-35. A first block 28 in the first array 26 corresponds to a first block 32 in the second array 27, i.e. represents a substantially overlapping section of the respective image frame. In the same manner, a second block 29 in the first array 26 corresponds to a second block 33 in the second array, a third block 30 corresponds to a third block 34 and a fourth block 31 to a fourth block 35 in the second array 27. Each of the blocks 32-35 in the second array 27 will be proportionally smaller in terms of the number of pixel values comprised therein than the corresponding one of the blocks 28-31 in the first array 26. In the example illustrated in FIG. 4A, the low-resolution image frame is represented by the second array 27 comprising blocks of 2×2 pixel values, whereas the high-resolution image frame is represented by the first array 26, having 8×8 pixel values per block 28-31. Only the pixel values in the first blocks 28, 32 are shown in FIG. 4A.

A discrete cosine transform into the spatial frequency domain is performed on a block-by-block basis. A first array 36 of DCT coefficients (FIG. 4B) is obtained by performing the DCT on the first array 26 representing the first image frame in the space domain. A second array 37 of DCT coefficients is obtained by performing a DCT on the second array 27. The first array 36 and second array 37 of DCT coefficients encode light intensity levels at each of a respective number of pixel positions in the respective image frame, only then in the spatial frequency domain. The number of DCT coefficients determines the spatial resolution.

In a next step, four DCT coefficients 38*a*-38*d* representing the lowest frequency components of the intensity distribution are derived from the first array 36 of DCT coefficients. Four DCT coefficients 39*a*-39*d* representing the components at the same frequency in the second array 37 of DCT coefficients are derived from that array. As the image frames have previously been aligned, the derived arrays represent light intensity levels at each of a common number of pixel positions in the first and second image frames. In the presented example, each derived array comprises four elements.

In a next step, an array 40 of DCT coefficients encoding a combined image (in the spatial frequency domain) is generated. The array 40 is also divided into four blocks 41-44. A first block 41 is based on the first blocks 28, 32, a second block 42 on the second blocks 29,33, a third block 43 on the third blocks 30,34, and a fourth block 44 is based on the values in the fourth blocks 31,35. Four DCT coefficients 45*a-d* represent the lowest frequency components of the section of the combined final image encoded by the first block 41. They are each based on a sum of intensity values represented by the values 38*a-d*, 39*a-d* of the corresponding elements in the arrays derived from the first and second arrays 36,37 of DCT coefficients. This could be done via an addition or averaging process. The remaining DCT coefficients in the first block 41 are based solely on those in the corresponding block of DCT coefficients in the first array 36 of DCT coefficients. They are thus based indirectly on the pixel values in the first block 28 of the first array 26 of pixel values. Thus, the combined final image is encoded at a higher resolution than the image frame represented by the second array 27 of pixel values. In the illustrated example the spatial resolution of the combined final image corresponds to that of the first image frame. In alternative embodiments, it has a value in between that of the first and second image frames.

The embodiment illustrated in FIGS. 4A-4C has a number of features that make implementation in the digital camera 1 attractive. There is no need to scale up the second array 27 of pixel values to the same number of pixel values as the first array 26. The interpolation that is thus avoided is particularly processing intensive, requiring a relatively powerful microprocessor 13. The number of additions required to carry out summation of intensity values is also relatively limited, as only the derived arrays of DCT coefficients 38*a-d*, 39*a-d* are added. Nevertheless, the combined final image is encoded at a resolution that is higher than that at which the low-resolution images on which it is based are encoded. This is the case because it is based on a sufficient number of the pixel values in the first array 26.

In an advantageous implementation, the transformation into the spatial frequency domain is carried out by using the co-processor 15. It will be recalled that the co-processor 15 comprises an implementation in hardware of an image compression algorithm, for example to generate JPEG-compressed images. The microprocessor 13 is thus spared from having to compute the DCT coefficients in the first and second arrays 36,37.

In one variant, the co-processor 15 converts the first and second arrays 26,27 to the JPEG-format, whereupon the array of combined intensity values is generated. In another embodiment, the co-processor 15 returns the DCT coefficients, with the microprocessor 13 carrying out the remaining steps in the method. In one implementation, the DCT coefficients are obtained by passing a null coefficient table for the entropy coding that is normally part of the image compression algorithm.

To achieve the property that each derived array encoding an adjusted image frame is generated in such a manner that corresponding intensity values encoding the region in the arrays represent light levels in an area surrounding the same pixel position, alignment using one or more of the methods outlined in PCT/EP04/051080 is advantageously applied. This applies equally to both embodiments of the combination method presented above. Relevant passages of that document are herein incorporated by reference. The step of alignment precedes the summation step in both embodiments illustrated herein. In the second embodiment, it generally precedes also the transformation into the spatial frequency domain. Without the alignment, the arrays of intensity values encoding the region in the adjusted image frames could still be said to have the property that they encode light levels in areas surrounding substantially the same one of a number of pixel positions, only the degree of correspondence in pixel position is slightly less due to the effect of camera shake.

Following adjustment to align the image frames and provided them with the same spatial resolution, the combined final image is formed. This is done by forming an array of pixel values encoding the region in a combined final image, such that each pixel value in the formed array is the sum of the corresponding pixel values in the arrays of pixel values encoding the region in the adjusted image frames.

Figure 5:
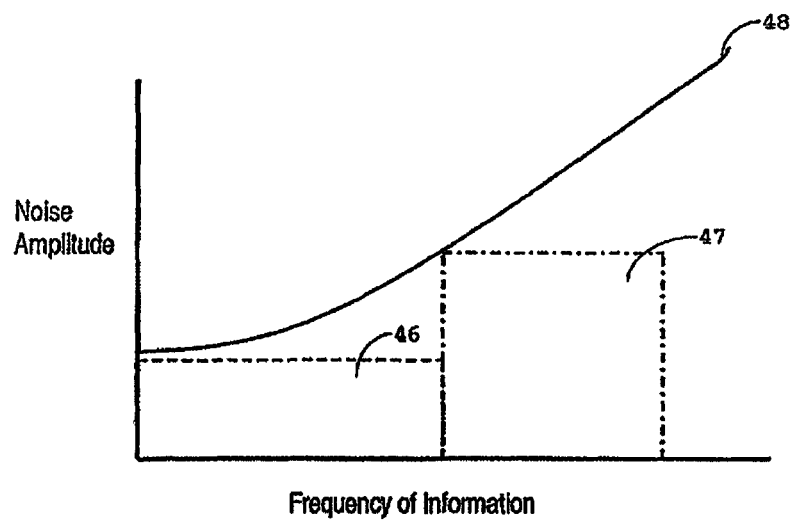
FIG. 5 is an illustration of noise levels of the image frames relative to the sensitivity of the human eye.

It has been outlined above that the captured image frames with higher resolution have a higher noise level, and that binning reduces the noise level. This is visible in FIG. 5, which also illustrates the advantageous effects of a noise shaping technique that can be used. The dashed line surrounding a leftmost area 46 delimits the boundaries of the range of frequency information contained in the binned, lower-resolution image, as well as indicating the noise level. The dashed and dotted line surrounding a right-most area 47 does the same for a higher resolution image to which a high-pass digital filter has been applied. The digital high-pass filter may be applied prior to adjustment of the spatial resolution and/or alignment, or subsequent thereto. Without the application of the high-pass filter, the right-most area 47 would extend to the lower frequencies, at the same noise level. A continuous curve 48 representing the sensitivity of the eye of a human (or animal for that matter), demonstrates that the noise level of the higher-resolution image frame at lower frequencies would have been perceptible. The noise shaping achieved by means of capturing separate low-resolution image frames and high-resolution image frames and by subjecting the latter to a high-pass filter results in a combined final image with an acceptable noise level at all spatial frequencies.

The invention is not limited to the embodiments described above, which may be varied within the scope of the attached claims. The number of different levels of spatial resolution employed to capture the image frames for one combined final image can be two or higher. High-pass filtering and summation of pixel values may be carried out in an image processing system external to the digital camera 1. Alternatively, all steps prior to the actual summation of pixel values to form the array of pixel values encoding the combined final image may be carried out in the digital camera. Such adjusted image frames are then stored in the digital camera 1 for subsequent transfer to a computer or other image processing system. Furthermore, instead of underexposing each captured image, the gain of an amplifier between the output of the image capturing device (CCD or CMOS) and the A/D converter can be set very high. This results in an image with visible noise. The exposure is "correct", but the image has a lower quality than would be the case with a slower exposure. The methods outlined above improve the image quality in such an embodiment.

What is claimed is:

1. A method of controlling an image capturing system to capture underexposed image frames used to provide a final combined image comprising an interface comprising a microprocessor, an output device and an input device for receiving an external trigger to capture an image, and an image capturing device provided with a photosensitive area and an array of pixel cells, each pixel cell including a device for generating a signal indicative of the intensity of light falling on an associated part of the photosensitive area, which image capturing device is further provided with readout circuitry comprising a selection circuit and a readout circuit for generating an array of pixel values to capture an underexposed image frame at a set spatial resolution, such that each pixel value represents an integral of the signal or signals generated in at least one of the pixel cells in an associated one of a number of cluster areas over an exposure time interval, the number of cluster areas being determined by the set spatial resolution, the cluster areas together covering a region of the photosensitive area corresponding to a region in the image, which method comprises:

receiving an external trigger to capture an image; and in response to the external trigger, directing the image capturing device to capture at least two underexposed image frames wherein the at least two underexposed image frames are captured by generating respective arrays of pixel values representing integrals over respective consecutive exposure time intervals, each exposure time interval being less than a desired exposure time of a final combined image, wherein the spatial resolutions of at least two of the captured image frames are set to different values and one of the spatial resolutions of one of the at least two captured image frames is lower than the spatial resolution of the at least one other captured image frame and wherein at least the length of the exposure time interval applicable to the image frame at the lower of the spatial resolution values is calculated in dependence of the spatial resolution value.

2. The method according to claim 1, wherein at least the lower of the spatial resolution values is set by directing the image capturing device to generate an array of pixel values in such a manner that each pixel value is representative of the integral of the sum of the signals generated by at least two devices in pixel cells.

3. The method according to claim 1, including retrieving a desired exposure time for a combined final image, determining the number of image frames to be captured, for each image frame, calculating settings determining an exposure level applicable to the image frame, the settings including the length of the exposure time interval, wherein the settings are calculated so that the sum of the lengths of the exposure time intervals over the number of image frames is equal to or less than the desired exposure time.

4. The method according to claim 1, including generating a set of arrays of pixel values, each array based on one of the captured image frames, in such a manner that each array encodes at least a region of an adjusted frame at the same spatial resolution.

5. An image capturing system configured to capture underexposed image frames used to provide a final combined image comprising: an interface comprising a microprocessor, an output device and an input device for receiving an external trigger to capture an underexposed image frame, an image capturing device provided with a photosensitive area and an array of pixel cells, each pixel cell including a device for generating a signal indicative of the intensity of light falling on an associated part of the photosensitive area, which image capturing device is further provided with readout circuitry comprising a selection circuit and a readout circuit for generating an array of pixel values to capture an underexposed image frame at a set spatial resolution, such that each pixel value represents an integral of the signal or signals generated in at least one of the pixel cells in an associated one of a number of cluster areas over an exposure time interval, the number of cluster areas being determined by the set spatial resolution, the cluster areas together covering a region of the photosensitive area corresponding to a region in the image, which image capturing system comprises a control system comprising a digital signal processor (DSP) and a microprocessor for controlling the operation of the image capturing device and for processing commands received through the interface, wherein the control system is configured to, in response to the external trigger, direct the image capturing device to capture at least two underexposed image frames wherein the at least two image frames are captured by generating respective arrays of pixel values representing integrals over respective consecutive exposure time intervals, each exposure time interval being less than a desired exposure time of a final combined image, wherein the control system is further configured to set the spatial resolutions of at least two of the captured image frames to different values, where one of the spatial resolutions of one of the at least two captured image frames is lower than the spatial resolution of the at least one other captured image frame and wherein at least the length of the exposure time interval applicable to the image frame at the lower of the spatial resolution values is calculated in dependence of the spatial resolution value.

6. A non-transitory computer readable storage medium having instructions which when executed by a processor of an image capturing system captures an image, the image capture system including an input device for receiving an external trigger and an image capturing device provided with a photosensitive area and an array of pixel cells, each pixel cell including a device for generating a signal indicative of the intensity of light falling on an associated part of the photosensitive area, which image capturing device is further provided with readout circuitry comprising a selection circuit and a readout circuit for generating an array of pixel values to capture an underexposed image frame at a set spatial resolution, such that each pixel value represents an integral of the signal or signals generated in at least one of the pixel cells in an associated one of a number of cluster areas over an exposure time interval, the number of cluster areas being determined by the set spatial resolution, the cluster areas together covering a region of the photosensitive area corresponding to a region in the image, the instructions comprising:

receiving an external trigger to capture an image; and in response to the external trigger, the processor directing the image capturing device to capture at least two underexposed image frames wherein the at least two underexposed image frames are captured by generating respective arrays of pixel values representing integrals over respective consecutive exposure time intervals, each exposure time interval being less than a desired exposure time of a final combined image, wherein the spatial resolutions of at least two of the captured image frames are set to different values and one of the spatial resolutions of one of the at least two captured image frames is lower than the spatial resolution of the at least one other captured image frame and wherein at least the length of the exposure time interval applicable to the image frame at the lower of the spatial resolution values is calculated in dependence of the spatial resolution value.

7. A digital camera comprising an image capturing system and/or an image processing system according to claim 5.

* * * * *